3,421,483
SUPPLEMENTAL FUEL SYSTEM
Clarence D. Fox, Decatur, Ill., assignor to Borg-Warner Corporation, a corporation of Illinois
Continuation-in-part of application Ser. No. 575,088, Aug. 25, 1966. This application June 16, 1967, Ser. No. 646,708
U.S. Cl. 123—27       17 Claims
Int. Cl. F02b *3/00;* F02m *21/00;* F02m *13/06*

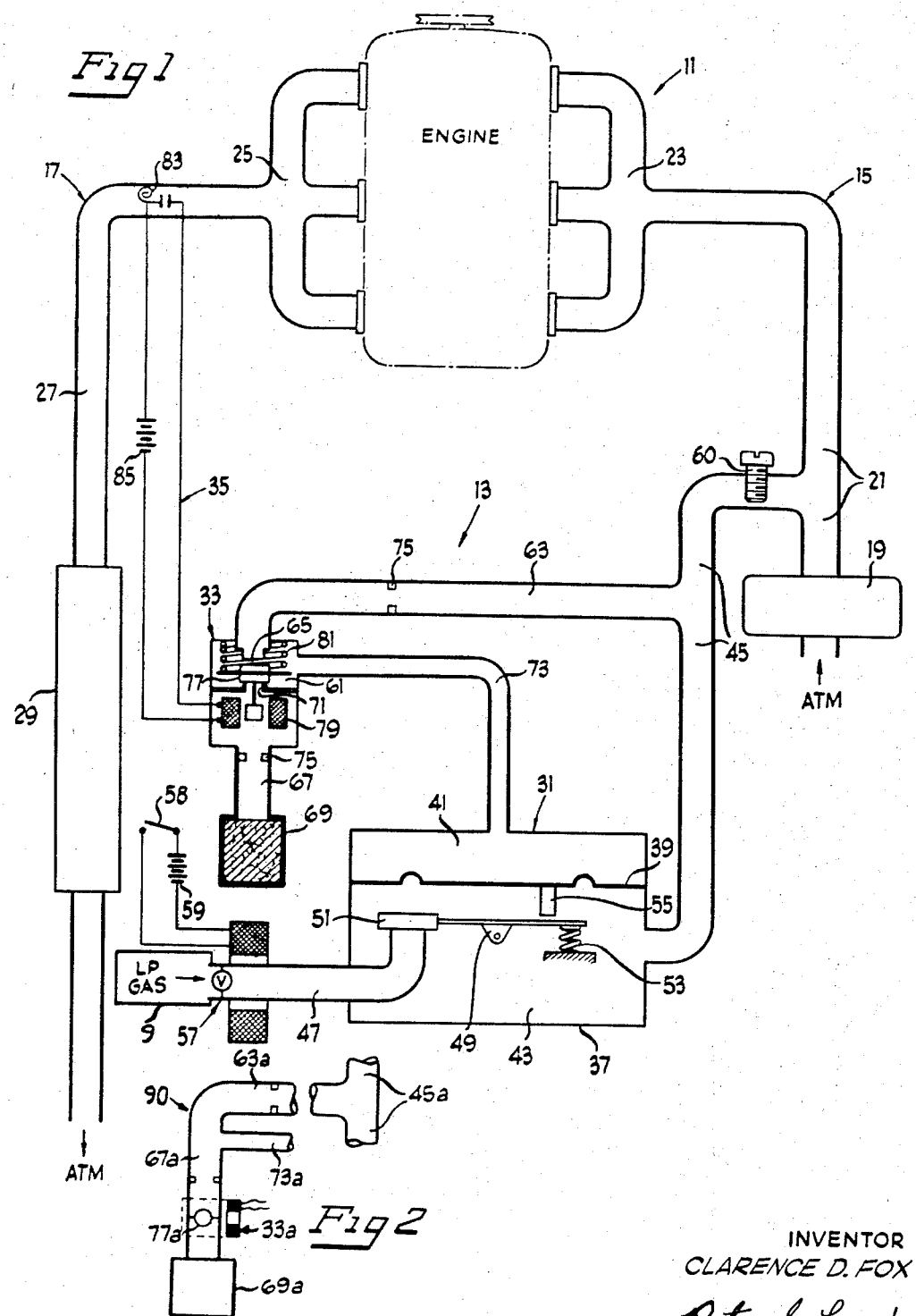

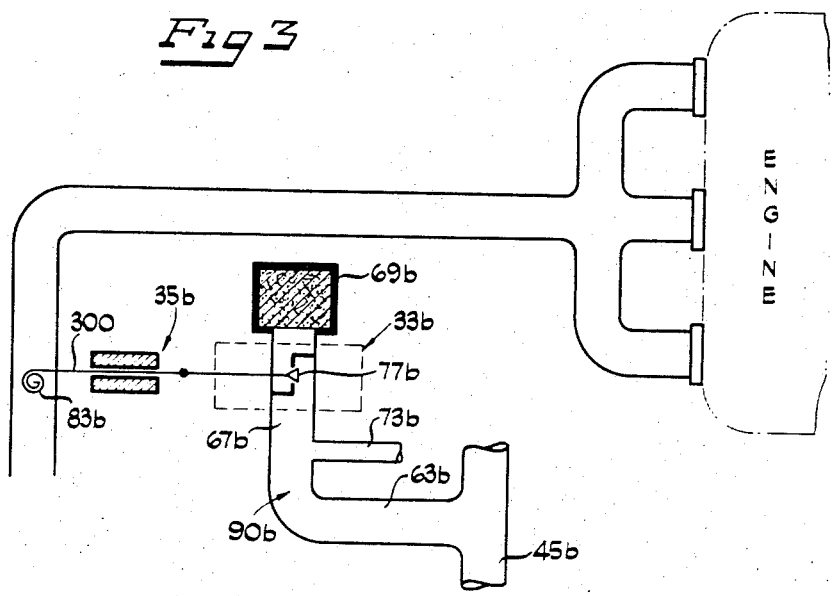
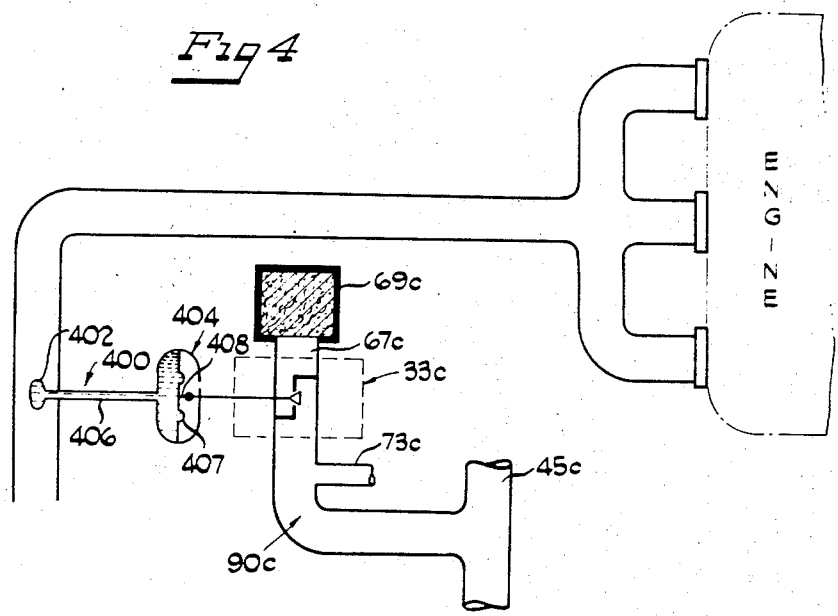

ABSTRACT OF THE DISCLOSURE

A supplemental fuel system for diesel engines. The supplemental fuel system provides a supply of gaseous fuel in response to engine operation at, or above, a predetermined load. The system includes a gaseous fuel regulator, a control valve assembly, and a load sensing and control means responsive to engine load to control the valve assembly which in turn activates the fuel regulator to supply gaseous fuel to the engine.

Other related applications

This application is a continuation-in-part of application Ser. No. 575,088 filed Aug. 25, 1966, now abandoned, by Clarence D. Fox.

Background of the invention

This invention relates to supplemental fuel systems for diesel engines. More particularly, it relates to an automatically controlled system which admits combustible gas into the intake air of a diesel engine to increase the power capabilities of the engine under high load.

It is well known that the power output of a diesel engine may be significantly increased by the addition of combustible gas into the engine intake air. Engine horsepower may be maintained with an accompanying decrease in the exhaust smoke, or, alternatively, it may be increased (by as much as forty percent) without any appreciable increase in exhaust smoke.

Several systems have been developed to accomplish the addition of combustible gas to diesel engine intake air. Most of these systems are controlled by, or are sensitive to, the setting of the engine throttle. Such arrangements are unable to appreciate differences in engine loading and gaseous fuel is admitted regardless of load. As a result, operation is not limited to high loads where the extra horsepower is most effective. Additionally, sudden changes in the throttle position result in surging of the supplemental gas which in turn causes irregular engine operation.

Attempts have been made to provide a throttle-controlled metering valve in the gasline to admit fuel proportionately with respect to throttle position. Such arrangements have proven to be quite difficult to install and to regulate by the operator.

Summary of invention

It is the principal object of the present invention to provide an improved supplemental fuel system for a diesel engine.

It is another object of the present invention to provide an improved supplemental fuel system for a diesel engine which admits a supply of combustible gas into the engine intake air.

It is another object of the present invention to provide such a system which is operative to admit gas only at high engine loads.

It is another object of the present invention to provide such a system which is activated and deactivated automatically, independent of the throttle setting in response to engine load.

It is a related object of the present invention to provide such a system which is activated and deactivated automatically in response to engine exhaust manifold temperature.

It is yet another object of the present invention to provide such a system which eliminates engine surging due to rapid institution or termination of the gas flow.

These and other objects and advantages of the present invention will become more apparent with reference to the following description and accompanying drawings.

Description of the drawings

FIGURE 1 is a schematic view showing a diesel engine in operative association with a supplemental fuel system illustrative of various features of the invention.

FIGURE 2 is a fragmentary schematic view of a modified form of the invention.

FIGURE 3 is a fragmentary schematic view of another modified form of the invention.

FIGURE 4 is a fragmentary schematic view of still another modified form of the invention.

Detailed description

Referring now to the drawing and with particular reference to FIGURE 1 there is shown a diesel engine generally designated 11 provided with a supplemental fuel system 13. The diesel engine 11 includes an air intake system 15 and a combustion product exhaust system 17 both of which are generally typical of conventional diesel engines and which are included to provide a descriptive environment for the supplemental fuel system of the present invention.

In this regard, the intake system includes an air filter 19, an intake duct 21, and an intake manifold 23 and the exhaust system includes an exhaust manifold 25, an exhaust duct 27 and a muffler 29. The engine includes a primary fuel system (not shown) which provides the diesel fuel needed for normal operation.

As seen in the drawing the supplemental fuel system 13 includes a source of combustible gaseous fuel 9 which is maintained at a regulated positive pressure by a regulator or the like (not shown). While such a regulated supply of gaseous fuel is desirable in that it prevents surging due to the relatively high supply tank pressures to which the system will be subjected if the regulator were not present, the scope of the invention contemplates the use of any gaseous fuel system and the regulated supply is shown only for purposes of illustration. The system further includes a regulator 31, a pressure control valve assembly 33, and a load sensing and control circuit generally designated 35. For purposes of illustration the fuel is considered to be LP (liquid petroleum) gas. However, any suitable gaseous fuel may be used without departing from the scope of the invention.

The regulator 31 may be any of a number of commercially available demand regulators and it should be understood that the following description is only for the purpose of operational clarification. The regulator includes a hollow housing 37 within which is disposed a flexible diaphragm 39 which forms with the housing a high and a low pressure chamber 41 and 43.

A manifold pressure conduit 45 connects the low pressure chamber to the engine intake duct 21 for delivery of the gaseous fuel to the intake air as will be explained. An adjusting screw 60 is provided in conduit 45 which is used to adjust the maximum fuel flow through conduit 47. A gas inlet pipe 47 also connects the chamber to the source of LP gas as supplied at a regulated pressure.

Pivotably mounted within the low pressure chamber is lever 49 which includes a valve cap 51 normally biased into an essentially gas-tight seal with gas inlet pipe 47 by a compressed spring 53. A lever arm 55 is movable with the diaphragm to provide a torque sufficient to open inlet pipe 47 as will be explained.

A solenoid valve assembly 57 is associated with inlet pipe 47 and is effective to stop gas flow when not activated and to maintain a supply of gas under pressure available at inlet pipe between the valve and valve cap 51 during normal operation.

The valve assembly 57 is energized through a series network including a power source 59 and a switch 58, which may be the running switch of the engine.

The pressure control valve assembly 33 defines a valve chamber 61. A secondary pressure conduit 63 connects the chamber 61 with the manifold pressure conduit 45, ending within chamber 61 in valve seat 65. An atmospheric conduit 67 opens to the atmosphere through air filter 69 and connects the atmosphere with chamber 61. This conduit includes a second valve seat 71 spaced directly opposite valve seat 71 spaced directly opposite valve seat 65.

A connecting conduit 73 also connects chamber 61 with high pressure chamber 41 in the regulator 31. Both conduit 63 and conduit 67 include a flow nozzle 75 to restrict the rate of pressure signal response.

A generally annular pressure valve 77 of sufficient size to close either of the valve seats 65 or 71 is mounted between the valve seats and in axial alignment with them. The valve is controlled by solenoid 79 and is normally biased against valve seat 71 by a compressed spring 81. The solenoid, when energized is effective to move valve 77 into sealing engagement with valve seat 65 when activated.

In its normal position thus described the supplementary fuel system conducts a pressure signal from intake duct 21 through manifold pressure conduit 45 to the low pressure chamber 43. Simultaneously, it conducts a pressure signal of the same magnitude through secondary pressure conduit 63 into valve chamber 61, through connecting conduit 73 and into the high pressure chamber 41. Thus, in normal position there is an equal pressure on either side of diaphragm 39 and the diaphragm is essentially centered. It is important to note that under this condition the valve cap 51 is in sealing engagement with the gas inlet pipe 47 to prevent the pressure condition existing within the chamber 43 from affecting the pipe 47. In this way gas is available as soon as the cap 51 is moved out of sealing engagement with the pipe 47.

In accordance with the present invention the supplemental fuel system and the diesel engine are interconnected in such a way that gas is automatically admitted to the intake duct 21 in response to increased engine load. It has been found that engine exhaust temperature as sensed, for example, in the exhaust duct 27 gives a good indication of engine load. That is to say, as the load increases exhaust temperature increases and vice versa. Therefore, the electrical network 35 is provided which includes a temperature-sensitive component is connected in series with solenoid 79 and a voltage source 85 which may be the same source as source 59. It is important to note that any arrangement for sensing engine load may be used, and that the temperature sensing arrangement is merely illustrative.

As the exhaust temperature rises in response to increased engine loads, switch 83 closes activating the solenoid 79. In response, valve 77 breaks its seal with valve seat 71 and moves into sealing engagement with valve seat 65. When the valve is in this new position, chamber 61 of pressure control valve no longer receives a manifold pressure signal but rather receives an atmospheric pressure signal which is of relatively greater magnitude. The increased signal is conducted through connecting conduit 73 to high pressure chamber 41.

Since the low pressure chamber is still receiving a manifold signal, a pressure differential exists across the diaphragm 39 and the diaphragm moves downward. This movement causes lever arm 55 to engage lever 49 pivoting valve cap 51 away from the gas inlet pipe 47 and allowing gas to flow directly to the intake conduit 21 through the manifold pressure conduit 45. The gas there mixes with the incoming intake air to accomplish the desired power-boosting effect. When engine load drops the switch 83 will open the electrical network, de-activating solenoid core 79 to return the supplemental fuel system to its normal position.

During transition to and from the gas admittance condition, flow nozzles 75 cause the pressure signal moving through conduit 67 or 63, respectively, to reach a controlled maximum rate. This rate control prevents the free flow which would otherwise cause instantaneous opening or closing of the gas inlet pipe and the ensuing gas surge which has been characteristic of previous systems.

Referring now to FIGURE 2, there is illustrated a modified form of the invention. In this arrangement all elements of the system are essentially the same as the system elements illustrated in FIGURE 1 except the pressure control valve assembly 33.

In this embodiment a secondary pressure conduit 63a, communicating with a manifold pressure conduit 45a, a connecting conduit 73a communicating with a regular high pressure chamber (not shown) similar to the chamber 61 of FIGURE 1, and an atmospheric conduit 67a connected to an air filter 69a are connected to allow communication between the conduits as at 90.

A single acting pressure control valve assembly 33a is disposed in the conduit 67a. This valve assembly includes a valve 77a movable from a normally closed position preventing communication between the atmosphere and conduits 63a and 73a and an open position allowing communication to atmosphere through the conduit 67a.

The valve assembly 33a is energized by a load sensing and control circuit such as the circuit 35 of FIGURE 1 so that operation is similarly automatic and sensitive to engine load. When the valve assembly 33a is energized the valve 77a assumes its open position and allows communication between the conduit 67a and conduits 63a and 73a. Communication of atmospheric pressure to conduit 73a exposes the high pressure chamber of the regulator (not shown) to a pressure differential as in the embodiment of FIGURE 1, thus supplying supplemental gaseous fuel to the engine air intake through conduit 45a.

It should be noted that in this arrangement when the valve assembly 33a is energized the valve 77a does not close conduit 63a and prevent communication to atmosphere. Therefore, a minute quantity of air may enter the engine intake system through conduit 63a.

Referring now to FIGURE 3, there is illustrated a modified form of the invention. In this arrangement all elements of the system are generally similar to the system elements illustrated in FIGURE 2 except that the arrangement illustrated in FIGURE 3 includes a load sensing and control means which operates a valve mechanically to introduce supplemental fuel into the intake system.

In this embodiment a secondary pressure conduit 63b, communicating with a manifold pressure conduit 45b, a connecting conduit 73b communicating with a regulator high pressure chamber (not shown) similar to the chamber 61 of FIGURE 1, and an atmospheric conduit 67b, connected to an air filter 69b are connected to allow communication between the conduits as at 90b.

A single acting pressure control valve assembly 33b is disposed in the conduit 67b. This valve assembly includes a valve 77b movable from a normally closed position preventing communication between the atmosphere and conduits 63b and 73b and a plurality of open positions allowing communication to atmosphere through the conduit 67b. Unlike the valve 77a of the embodiment of FIGURE 2 it is contemplated that the valve 77b is of the modulator type. That is to say, it is capable of being opened in varying degrees, rather than having one fully open and one fully closed position. For this reason, initial opening of the valve causes minute quantities of air to enter the conduit 67b and subsequent additional opening of the valve produces a corresponding increase in flow. Also, when the valve is moved toward the closed position the reverse condition exists and a proportional reduction of air entry is achieved in relation to valve movement. Because of this modulating effect of the valve 77b, the possibility of surging of the system is eliminated and smooth transition between normal operation and operation with supplemental fuel is achieved. However, a valve such as the valve 77a of the embodiment of FIGURE 2 having only an open and a closed position could be used in this embodiment without departing from the scope of the invention. In that case, surging would be effectively controlled with the use of orifice adjusting screws such as the adjusting screws 60 of the embodiment of FIGURE 1.

The valve assembly 33b is activated by load sensing and control means 35b. The load sensing and control means 35b includes a bi-metallic element 83b and a slidable linkage 300, operatively connected to the valve assembly 33b to move the valve 77b between its open and closed positions in response to engine load. The bi-metallic element 83b senses engine exhaust temperature and therefore engine load, and as load and exhaust temperature increase, the bi-metallic element urges the valve 77b toward its open positions through the linkage 300. When a predetermined load is reached valve 77b begins to open and allow communication between the conduit 67b and conduit 63b and 73b. As the temperature, and consequently the load are increased, the valve opening is increased allowing a greater amount of air to enter the system.

Communication of atmospheric pressure to conduit 73b exposes the high pressure chamber of the regulator (not shown) to a pressure differential as in the embodiment of FIGURE 1, thus supplying supplemental gaseous fuel to the engine air intake through conduit 45b.

It should be noted that in this arrangement as in that shown in FIGURE 2 when the valve 77b is opened it does not close conduit 63b and prevent communication to atmosphere. Therefore, a minute quantity of air may enter the engine intake system through conduit 63b.

Referring now to FIGURE 4, there is illustrated another modified form of the invention. In this arrangement all elements of the system are generally similar to the system elements illustrated in FIGURE 3 except that the load sensing and control means is slightly modified.

In this embodiment a secondary pressure conduit 63c, communicating with a manifold pressure conduit 45c, a connecting conduit 73c communicating with a regulator high pressure chamber (not shown) similar to the chamber 61 of FIGURE 1, and an atmospheric conduit 67c connected to an air filter 69c are connected to allow communication between the conduits as at 90c.

A single acting pressure control valve assembly 33c is disposed in the conduit 67c. This valve assembly includes a valve 77c similar to the valve 77b of the embodiment of FIGURE 3 which is movable from a normally closed position preventing communication between the atmosphere and conduits 63c and 73c and a plurality of open positions allowing communication to atmosphere through the conduit 67c in the manner previously described. Again, it should be noted that this valve could, alternatively be of the type shown and described in the embodiment of FIGURE 2.

The valve assembly 33c is energized by the load sensing and control means 35c. The load sensing and control means 35c includes a hydraulic system 400, which, in turn, includes a fluid retaining bulb 402 disposed in the exhaust manifold, an actuator 404 and a connecting capillary tube 406. The system includes a fluid which is subject to change in volume in response to a change in temperature. Any suitable fluid may be used, such as mercury, or the like. It is contemplated that in the event exhaust temperatures normally experienced in an engine application are excessive, adequate shielding of the hydraulic system bulb should be provided. It is only necessary that the bulb experience the temperature variation associated with varying load and it is not necessary that the bulb be exposed to the absolute magnitude of the exhaust temperature.

The actuator includes a diaphragm 407 movable in response to expansion of the hydraulic fluid, and a linkage 408 operatively connected to the valve assembly 33c to move the valve 77c between its open and closed positions. As the engine load, and consequently exhaust temperature increases, the fluid in the bulb is heated and caused to increase in volume. The volume change is transmitted through the capillary tube 404 to the actuator and moves the diaphragm 406 in a direction to open the valve 77c through the linkage 408. When a predetermined load is reached, valve 77c assumes an open position and allows communication between the conduit 67c and conduits 63c and 73c. Communication of atmospheric pressure to conduit 73c exposes the high pressure chamber of the regulator (not shown) to a pressure differential as in the embodiment of FIGURE 1, thus supplying supplemental gaseous fuel to the engine air intake through conduit 45c.

As can readily be appreciated an improved supplemental fuel system has been shown and described which is operative automatically in response to engine load. Further, the system is so arranged as to eliminate the problem of gaseous fuel surging when the system is activated or deactivated.

Various of the features of the invention have been particularly shown and described in connection with the illustrated embodiments of the invention. However, it must be understood that these particular arrangements merely illustrate and that the invention is to be given its fullest interpretation within the scope of the appended claims.

I claim:

1. A supplemental fuel system adapted to be operatively associated with a diesel engine including an intake system having an intake manifold which admits air from the atmosphere and an exhaust system which conduits exhaust from the engine, said supplemental fuel system comprising: a source of combustible gaseous fuel; a demand regulator defining a low pressure chamber and a high pressure chamber, a gas inlet pipe connecting said source of gaseous fuel to said low pressure chamber, said gaseous fuel being normally prevented from entering said low pressure chamber by means in said regulator, said means being responsive to a pressure differential between said high pressure chamber and said low pressure chamber to allow a gaseous fuel to enter said low pressure chamber; a manifold pressure conduit connecting said low pressure chamber to said intake system intake manifold and defining a passage for delivery of gas to said intake system; a secondary pressure conduit connected to said manifold pressure conduit; a connecting conduit connected to said high pressure chamber of said regulator, and an atmospheric conduit connected to the atmosphere; said secondary pressure conduit, said connecting conduit, and said atmospheric conduit being connected in communication with each other; a pressure control valve assembly including a valve movable between a normally closed and at least one open position, said valve being disposed so as to prevent communication of atmosphere to said connecting conduit through said atmospheric conduit when in said normally closed position, and allowing communication of atmosphere to said connecting conduit through said atmospheric conduit when in said open position, thereby creating a pressure differential between said high pressure chamber and said low pressure chamber, and load sensing and control means connected to said pressure control valve assembly effective to activate said pressure control valve in response to a predetermined load to move said valve to said open position.

2. A supplemental fuel system as claimed in claim 1 wherein said pressure control valve is electrically operated and said load sensing and control means includes an electrical circuit connected to said pressure control valve including means responsive to engine load effective to activate said pressure valve assembly in response to a predetermined load to move said valve to said open position.

3. A supplemental fuel system as claimed in claim 2 wherein said electrical circuit includes a temperature sensitive switch adapted to be disposed in the engine exhaust system; said switch being effective to energize said pressure control valve in response to engine exhaust temperature.

4. A supplemental fuel system as claimed in claim 3 wherein said temperature-sensitive switch includes a bi-metallic element.

5. A supplemental fuel system as claimed in claim 2 wherein said pressure control valve assembly valve is disposed in said atmospheric conduit.

6. A supplemental fuel system as claimed in claim 2 wherein said source of gas comprises LP (liquid petroleum) gas.

7. A supplemental fuel system as claimed in claim 2 wherein said secondary pressure conduit and said atmospheric conduit include flow nozzles effective to prevent surging of said gas.

8. A supplemental fuel system as claimed in claim 1 wherein said pressure control valve is electrically operated and defines a chamber; said secondary pressure conduit includes valve seat in said chamber, and connects said chamber to said manifold pressure conduit; said connecting conduit is connected between said chamber and said high pressure chamber of said regulator; said atmospheric conduit includes a valve seat in said chamber, of said valve and connects said chamber to the atmosphere; said pressure control valve assembly includes a valve biased in essentially sealing relation with said atmospheric valve seat when said assembly is deactivated and which is movable out of sealing relation with said atmospheric valve seat and into essentially sealing relation with said secondary pressure valve seat when activated thereby allowing communication of atmosphere to said connecting conduit to establish a pressure differential between said high pressure chamber and said low pressure chamber and additionally preventing communication of load sensing and control atmosphere to said secondary conduit and wherein said means includes an electrical circuit connected to said electrically-operated control valve including means responsive to engine load effective to activate said pressure valve assembly in response to a predetermined load to effect said valve movement.

9. A supplemental fuel system as claimed in claim 8 wherein said electrical circuit includes a temperature-sensitive switch adapted to be disposed in the engine exhaust system; said switch being effective to energize said pressure control valve in response to engine exhaust temperature.

10. A supplemental fuel system as claimed in claim 9 wherein said temperature-sensitive switch includes a bi-metallic element.

11. A supplemental fuel system as claimed in claim 8 wherein said source of gas comprises LP (liquid petroleum) gas.

12. A supplemental fuel system as claimed in claim 8 wherein said secondary pressure conduit and said atmospheric conduit include flow nozzles effective to prevent surging of said gas.

13. A supplemental fuel system as claimed in claim 1 wherein said load sensing and control means connected to said pressure control valve assembly includes a slidable lever arrangement connected to said valve adapted to move said valve between said closed and said open positions, and a means responsive to engine load connected to said linkage to operate said valve through said linkage.

14. A supplemental fuel system as claimed in claim 13 wherein said means responsive to engine load includes a bi-metallic element adapted to be disposed in the engine exhaust system, effective to operate said valve assembly in response to variation in engine exhaust temperature.

15. A supplemental fuel system as claimed in claim 14 wherein said valve is a modulator type valve having a closed and a plurality of open positions and wherein said load sensing and control means is effective to move said valve from said closed to said plurality of open positions in response to increased engine load.

16. A supplemental fuel system as claimed in claim 1 wherein said load sensing and control means connected to said pressure control valve includes a hydraulic system having a supply of fluid subject to a change in volume in response to a change in temperature, a fluid retaining bulb adapted to be disposed in the engine exhaust system, an actuator including a movable diaphragm exposed to said fluid, a linkage connected between said diaphragm and said valve to move said valve between said closed and said open positions in response to movement of said diaphragm, and means providing fluid communication between said bulb and said actuator, said change in volume of said fluid in response to change in temperature of said fluid being effective to move said diaphragm to effect movement of said valve.

17. A supplemental fuel system as claimed in claim 16 wherein said valve is a modulator type valve having a closed and a plurality of open positions and wherein said load sensing and control means is effective to move said valve from said closed to said plurality of open positions in response to increased engine load.

No references cited.

LAURENCE M. GOODRIDGE, *Primary Examiner.*

U.S. Cl. X.R.

123—120, 122, 127